US012681972B1

(12) United States Patent
Guillot et al.

(10) Patent No.: US 12,681,972 B1
(45) Date of Patent: Jul. 14, 2026

(54) SYSTEM AND METHOD FOR ANALYZING DRILLING EVENTS

(71) Applicant: Schlumberger Technology Corporation, Sugar Land, TX (US)

(72) Inventors: Valerian Guillot, Montpellier (FR); Alexey Ruzhnikov, Abu Dhabi (AE); Pierre Sesboue, Montpellier (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/090,501

(22) Filed: Mar. 26, 2025

(51) Int. Cl.
*G06F 16/334* (2025.01)
*G06F 16/34* (2019.01)

(52) U.S. Cl.
CPC ........ *G06F 16/3347* (2019.01); *G06F 16/345* (2019.01)

(58) Field of Classification Search
None
See application file for complete search history.

(56) References Cited

U.S. PATENT DOCUMENTS

| | | | |
|---|---|---|---|
| 12,320,938 B1 * | 6/2025 | Mousa | G06F 16/22 |
| 2010/0121623 A1 * | 5/2010 | Yogeswaren | G06F 16/23 |

| | | | |
|---|---|---|---|
| 2018/0348998 A1 * | 12/2018 | Mueller | G06F 16/2237 |
| 2020/0018160 A1 * | 1/2020 | AlBahrani | G06F 16/245 |
| 2020/0134103 A1 * | 4/2020 | Mankovskii | G06F 16/24573 |
| 2020/0332627 A1 * | 10/2020 | Tang | G06F 16/33 |
| 2021/0165963 A1 * | 6/2021 | Mendes | G06F 16/33 |
| 2021/0285321 A1 * | 9/2021 | Verma | G06F 16/345 |
| 2025/0111336 A1 * | 4/2025 | Michalopulos | G06F 16/90 |

OTHER PUBLICATIONS

Miller, D., "Leveraging BERT for Extractive Text Summarization on Lectures", Retrieved from the internet: https://arxiv.org/abs/1906. 04165. Retrieved date- Jan. 6, 2026, 7 Pages.

* cited by examiner

*Primary Examiner* — Son T Hoang
(74) *Attorney, Agent, or Firm* — Kyle R. Miiller

(57) ABSTRACT

A method for analyzing undesired drilling events in a well includes receiving input data including daily drilling reports (DDRs) related to the well. The method also includes converting respective first portions of the DDRs related to one or more undesired drilling events into vectors, each vector including an embedded semantic meaning. The method further includes plotting each of the vectors on a 2D graph, and determining semantic similarities between the vectors with the 2D graph. A respective distance between the vectors represents a degree of semantic similarities therebetween. The method may also include generating clusters of the vectors plotted on the 2D graph based upon the semantic similarities, and identifying a single vector of each of the clusters that represents a summary of the respective cluster. The method may also include generating a summary of the one or more undesired drilling events with the identified single vectors.

14 Claims, 5 Drawing Sheets

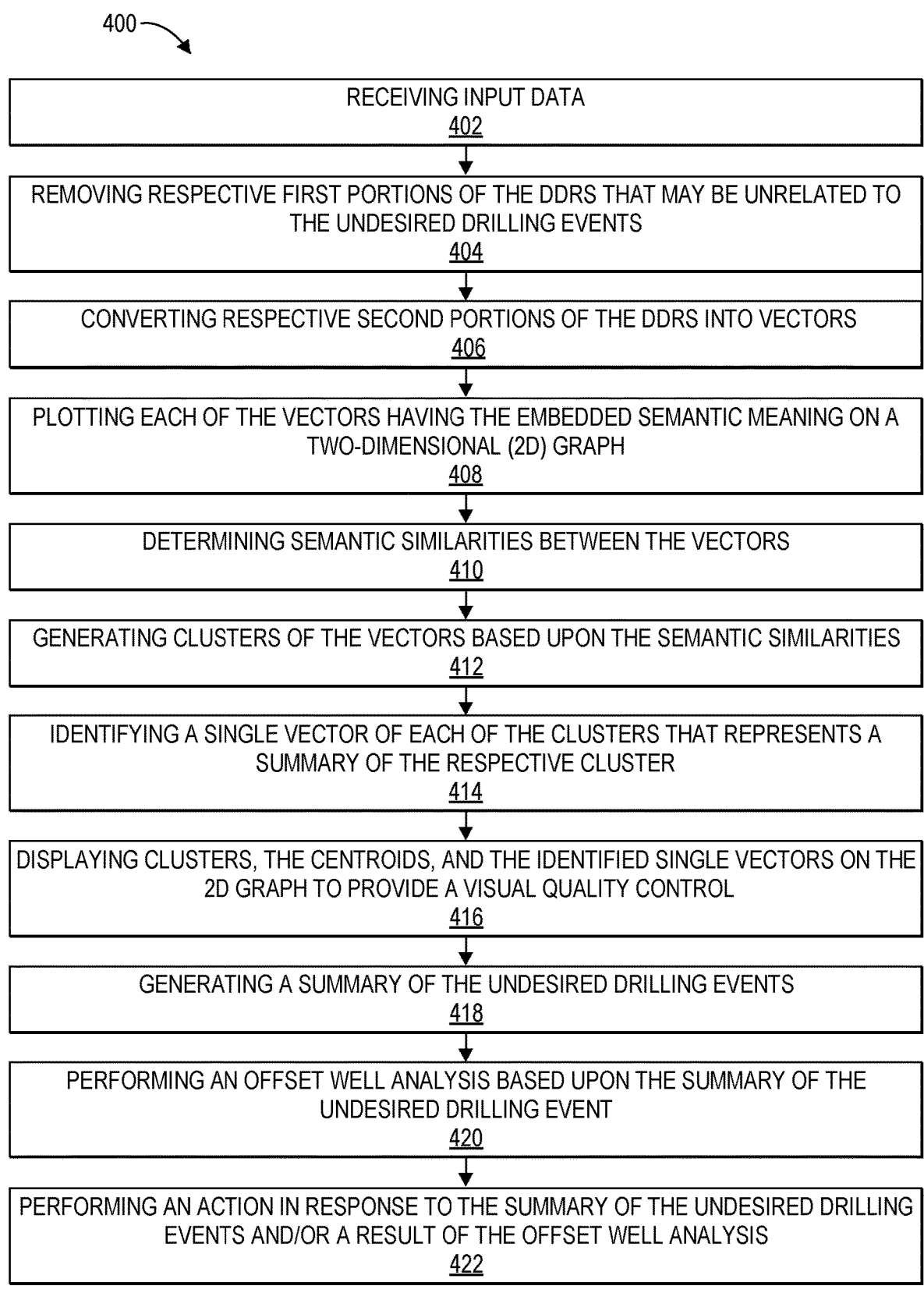

400

RECEIVING INPUT DATA
402

REMOVING RESPECTIVE FIRST PORTIONS OF THE DDRS THAT MAY BE UNRELATED TO THE UNDESIRED DRILLING EVENTS
404

CONVERTING RESPECTIVE SECOND PORTIONS OF THE DDRS INTO VECTORS
406

PLOTTING EACH OF THE VECTORS HAVING THE EMBEDDED SEMANTIC MEANING ON A TWO-DIMENSIONAL (2D) GRAPH
408

DETERMINING SEMANTIC SIMILARITIES BETWEEN THE VECTORS
410

GENERATING CLUSTERS OF THE VECTORS BASED UPON THE SEMANTIC SIMILARITIES
412

IDENTIFYING A SINGLE VECTOR OF EACH OF THE CLUSTERS THAT REPRESENTS A SUMMARY OF THE RESPECTIVE CLUSTER
414

DISPLAYING CLUSTERS, THE CENTROIDS, AND THE IDENTIFIED SINGLE VECTORS ON THE 2D GRAPH TO PROVIDE A VISUAL QUALITY CONTROL
416

GENERATING A SUMMARY OF THE UNDESIRED DRILLING EVENTS
418

PERFORMING AN OFFSET WELL ANALYSIS BASED UPON THE SUMMARY OF THE UNDESIRED DRILLING EVENT
420

PERFORMING AN ACTION IN RESPONSE TO THE SUMMARY OF THE UNDESIRED DRILLING EVENTS AND/OR A RESULT OF THE OFFSET WELL ANALYSIS
422

FIG. 4

SYSTEM AND METHOD FOR ANALYZING DRILLING EVENTS

BACKGROUND

Planning a well section of a well often includes reviewing and analyzing historical data to understand the context and remediation actions applied. The historical data is often provided in the form of Daily Drilling Reports (DDRs), which includes varying occurrences of risks and actions taken to mitigate the risks. Reviewing and analyzing the historical data, however, is often prohibitive or not feasible at scale as it involves reading through a large number of DDRs to build an understanding of the historical drilling events. A conventional method for analyzing the historical data may include representing the occurrences of risks in a graphical representation. This approach, however, does not give well engineers sufficient context about the cause of the occurrences of risk or the mitigating actions taken in response. Other methods for reviewing and analyzing the historical data include utilizing a generative artificial intelligence (AI) approach where a prompt for summarization of the DDR may be used. The generative AI approach, however, is resource intensive and involves costly infrastructure. Additionally, the generative AI approach introduces the risk of hallucinations, which may have severe consequences in the context of risk analysis.

What is needed, then, are improved systems and methods for analyzing undesired drilling events of a well.

SUMMARY

A method for analyzing undesired drilling events in a well is disclosed. The method includes receiving input data including daily drilling reports (DDRs) related to the well. The DDRs include data related to one or more undesired drilling events in the well. The method also includes converting respective first portions of the DDRs related to the one or more undesired drilling events into vectors. Each vector includes an embedded semantic meaning. The method further includes plotting each of the vectors on a two-dimensional (2D) graph. The method also includes determining semantic similarities between the vectors with the 2D graph. A respective distance between the vectors represents a degree of semantic similarities therebetween. The method also include generating clusters of the vectors plotted on the 2D graph based upon the semantic similarities. The method further includes identifying a single vector of each of the clusters that represents a summary of the respective cluster. The method also includes generating a summary of the one or more undesired drilling events with the identified single vectors.

A computing system is also disclosed. The computing system includes one or more processors and a method system. The method system includes one or more non-transitory computer-readable media storing instructions that, when executed by at least one of the one or more processors, cause the computing system to perform operations. The operations include receiving input data. The input data is related to a drilling operation in the well and includes daily drilling reports (DDRs) related to the well. The DDRs include historical data related to the well. The historical data includes one or more undesired drilling events in the well. The operations also include removing respective first portions of the DDRs that are unrelated to the one or more undesired drilling events. The operations further include converting respective second portions of the DDRs that are related to the one or more undesired drilling events into vectors with a pre-trained embedding model. Each vector includes an embedded semantic meaning. The operations also includes plotting each of the vectors having the embedded semantic meaning on a two-dimensional (2D) graph. Plotting each of the vectors includes determining an x-axis and a y-axis of the 2D graph with the vectors. The operations also include determining semantic similarities between the vectors with the 2D graph. The semantic similarities are based upon the embedded semantic meaning. A respective distance between the vectors on the 2D graph represents a degree of semantic similarities therebetween. The operations also include generating clusters of the vectors plotted on the 2D graph based upon the semantic similarities. A first cluster of the clusters is related to losses circulation events, a second cluster of the clusters is related to mitigation actions, and a third cluster of the clusters is related to dynamic tests. The operations also include identifying a single vector of each of the clusters that represents a summary of the respective cluster. The operations further include generating a summary of the one or more undesired drilling events with the identified single vectors of each of the clusters by concatenating the single vectors to build the summary of the one or more undesired drilling events.

A non-transitory computer-readable medium is also disclosed. The medium stores instructions that, when executed by one or more processors of a computing system, cause the computing system to perform operations. The operations include receiving input data. The input data is related to a drilling operation in the well. The input data includes daily drilling reports (DDRs) related to the well. The DDRs include historical data related to the well. The DDRs include sentences related to the historical data. The historical data includes one or more undesired drilling events in the well. The operations also include removing respective first portions of the DDRs including sentences that are unrelated to the one or more undesired drilling events. The first portions of the DDRs include day-to-day operational context of the well. The operations also include converting respective second portions of the DDRs including sentences that are related to the one or more undesired drilling events into vectors with a pre-trained embedding model. Each of the sentences that are related to the one or more undesired drilling is converted to a respective vector. Each of the vectors includes an embedded semantic meaning. The operations further include plotting each of the vectors having the embedded semantic meaning on a two-dimensional (2D) graph. Plotting each of the vectors includes displaying each of the vectors on the 2D graph. Each of the vectors is annotated with the sentence related to the respective vector. Plotting each of the vectors also includes determining an x-axis and a y-axis of the 2D graph with the vectors. Determining the x-axis and the y-axis of the 2D graph includes extracting eigenvectors from the vectors. Each of the eigenvectors includes an eigenvalue. Determining the x-axis and the y-axis of the 2D graph also includes identifying the eigenvectors having the two largest eigenvalues. The eigenvectors having the two largest eigenvalues represent the x-axis and the y-axis. The operations also include determining semantic similarities between the vectors with the 2D graph. The semantic similarities are based upon the embedded semantic meaning. The semantic similarities are determined via a cosine similarity model. A respective distance between the vectors on the 2D graph represents a degree of semantic similarities therebetween. The operations also include generating clusters of the vectors on the 2D graph based upon the semantic similarities. A first cluster of the clusters is related to losses circulation events. A second cluster of the clusters is related to mitigation actions. A third cluster of the clusters is related to dynamic tests. The operations also include identifying a single vector of each of the clusters that represents a summary of the respective cluster. Identifying the single vector includes identifying a centroid of each of the clusters. The respective centroid of each of the clusters is a weighted average position of the vectors of the respective cluster. Identifying the single vector also includes identifying the single vector of each of the clusters closest to the respective centroid thereof. The sentence associated with the single vector of each of the clusters represents the summary of the respective cluster. The operations also include displaying the clusters, the centroids, and the identified single vectors on the 2D graph to provide a visual quality control. The operations further include generating a summary of the one or more undesired drilling events with the identified single vectors of each of the clusters by concatenating the single vectors to build the summary of the one or more undesired drilling events. The operations also include performing an offset well analysis based upon the summary of the one or more undesired drilling event. The operations also include performing an action in response to the summary of the one or more undesired drilling events and/or a result of the offset well analysis. The action includes one or more of a prevention action, a mitigation action, a contingency action, a remediation action, or a combination thereof.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 3 illustrates a flowchart of a system for analyzing drilling events of the well, according to an embodiment.

FIG. 4 illustrates a flowchart of a method for analyzing undesired drilling events in a well, according to an embodiment.

DETAILED DESCRIPTION

Reference will now be made in detail to embodiments, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

System Overview

Figure 1:
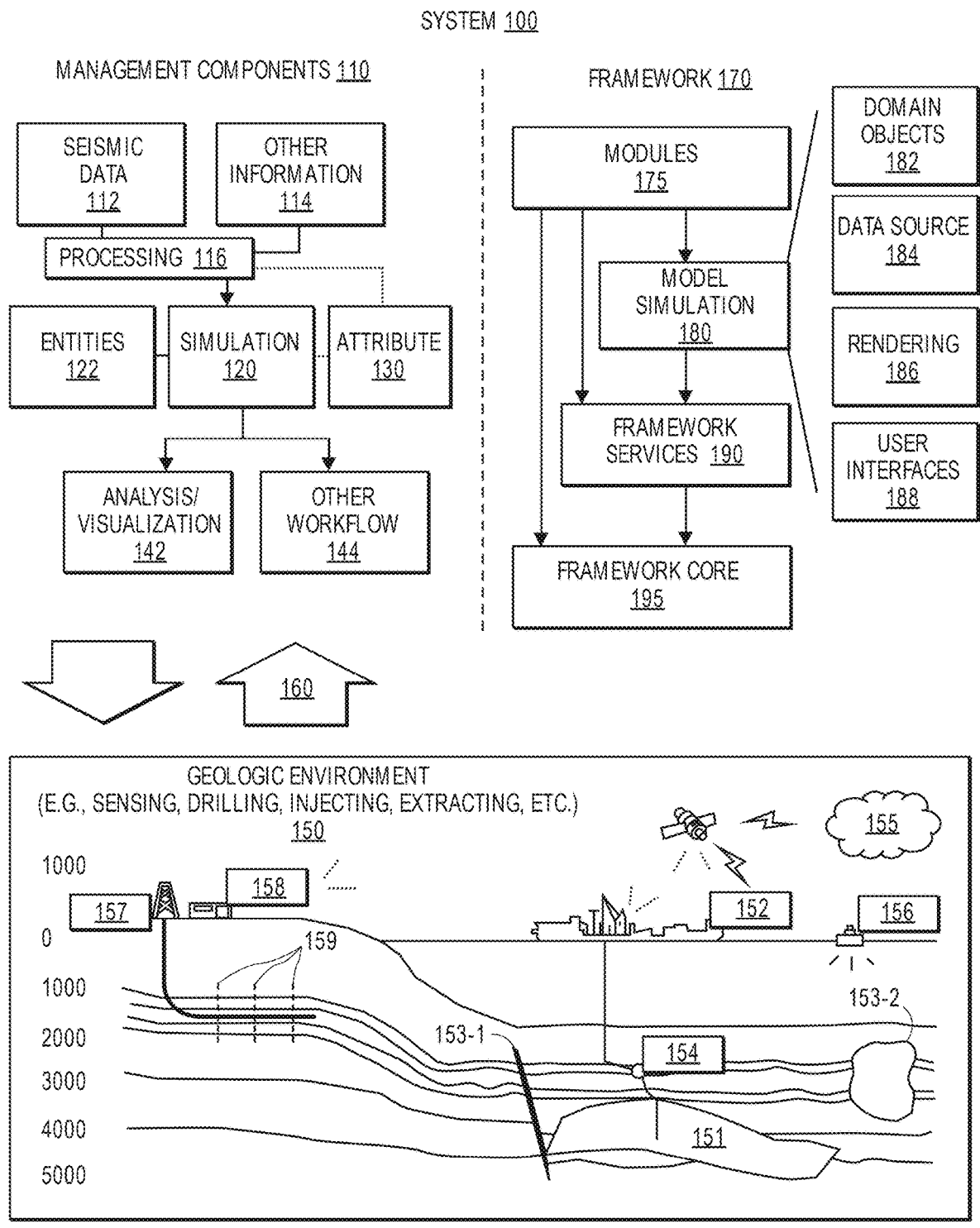
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (SLB, Houston Texas), the INTERSECT™ reservoir simulator (SLB, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

As an example, the simulation component 120 may include one or more features of a simulator such as SYMMETRY software (SLB, Houston, Texas). More particularly, SYMMETRY may process workflows in a single integrated environment with accurate thermodynamic fluid representation and consistent modeling across multiple disciplines including process, production, and HSE. The simulator integrates steady-state and transient (e.g., dynamic) analyses that can be tailored for each domain. This approach enables users to optimize processes in upstream, midstream, and downstream sectors while maximizing profits and minimizing capital expenditures. It may also help reduce emissions, energy consumption, and waste.

As an example, the simulation component 120 may include one or more features of a simulator such as PIPESIM (SLB, Houston, Texas). More particularly, PIPESIM is a steady-state multiphase flow simulator that incorporates the three areas of flow modeling: multiphase flow, heat transfer and fluid behavior.

As an example, the simulation component 120 may include one or more features of a simulator such as OLGA™ (SLB, Houston, Texas). More particularly, OLGA™ is a dynamic multiphase flow simulator that models transient flow (e.g., time-dependent behaviors) to maximize production potential. Transient modeling is a component for feasibility studies and field development design. Dynamic simulation is useful in deep water and is used in both offshore and onshore developments to investigate transient behavior in pipelines and wellbores. Transient simulation with the OLGA™ simulator provides an added dimension to steady-state analysis by predicting system dynamics, such as time-varying changes in flow rates, fluid compositions, temperature, solids deposition, and operational changes.

In an example embodiment, the management components 110 may include features of a commercially available framework such as the PETREL® seismic to simulation software framework (SLB, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (SLB, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

The present disclosure includes a method for reviewing and analyzing drilling events of a well or a drilling operation. Particularly, the present disclosure is directed to a method for reviewing and analyzing undesired drilling events in a well. As further described herein, the method may include receiving input data (e.g., daily drilling reports). The method may also include removing respective first portions of the input data that may be unrelated to the undesired drilling events. The method may further include converting respective second portions of the input data into vectors, where each of the vectors may have an embedded semantic meaning. The method may also include plotting each of the vectors on a two-dimensional (2D) graph. The method may also include determining semantic similarities between the vectors based upon the embedded semantic meaning. The method may also include generating clusters of the vectors based upon the semantic similarities. The method may also include identifying a single vector of each of the clusters that may represent a summary of the respective cluster. The method may also include displaying the clusters and the identified single vector on the 2D graph to provide a visual quality control. The method may also include generating a summary of the undesired drilling event. The method may also include performing an offset well analysis based upon the summary of the undesired event. The method may also include performing an action in response to the summary of the undesired drilling events.

As noted above, the method for reviewing and analyzing the drilling events in a well may include receiving input data. The input data may include input data related to a drilling operation in the well. The input data may include at least a portion of the data and information related to the well. For example, the input data may be or include one or more daily drilling reports (DDRs) representing the historical data of the well. In another example, the input data may be or include one or more DDRs representing a portion or a period of the historical data of the well. The DDRs may include words, phrases, sentences, or a combination thereof that describe or relate to at least a portion of the historical data of the well. The DDRs may include words, phrases, and/or sentences describing or relating to one or more drilling events of the well. For example, the DDRs may include words, phrases, and/or sentences describing or relating to one or more undesired drilling events. The undesired drilling events may be or include, but are not limited to, a stuck pipe event, a loss circulation event, or a combination thereof. Each of the undesired drilling events may include details or information about a failure mode, remedial attempts, or any combination thereof. The DDRs may also include words, phrases, and/or sentences describing or relating to one or more actions applied to the well. For example, the DDRs may include words, phrases, and/or sentences describing or relating to one or more remediation and/or mitigation actions applied to the well. In yet another example, the DDRs may include words, phrases, and/or sentences describing or relating to day-to-day operational information related to the well or the drilling operation.

The method may include converting each of the DDRs, or one or more portions thereof, into vectors, where each vector may have or include an embedded semantic meaning. For example, the method may include converting one or more of the words, phrases, and/or sentences of the DDRs into respective vectors with the embedded semantic meaning. In an exemplary embodiment, the method includes converting each sentence of the respective DDRs into a vector with the embedded semantic meaning. The respective sentences of each of the DDRs may be converted into vectors with a pre-trained embedding model. In an exemplary embodiment, the pre-trained embedding model may be a Bidirectional Encoder Representation from Transformers (BERT) model. Specifically, the pre-trained embedding model may be a Sentence-BERT (sBERT) model capable of or configured to convert each of the sentences of the DDRs into respective vectors having or including sentence embeddings or the embedded semantic meaning.

In at least one embodiment, the method may include removing, omitting, or otherwise masking one or more portions of each of the DDRs before converting the DDRs into the vectors. For example, the method may include removing a first portion of the DDRs before converting the DDRs into the vectors. The first portion of the DDRs may be or include one or more portions (e.g., words, phrases, and/or sentences) that may be unrelated to a target drilling event. For example, when utilizing the methods disclosed herein for reviewing and analyzing a particular undesired drilling event, the method may include removing the first portion, including one or more sentences, of the DDRs that may be unrelated to the undesired drilling event. Illustrative first portions of the DDRs that may be unrelated to the undesired drilling event may be or include, but are not limited to, the day-to-day operational context of the well or the drilling operation, such as the rate of penetration (ROP), information related to a bottom hole assembly (BHA), or the like, or any combination thereof.

Figure 2A:
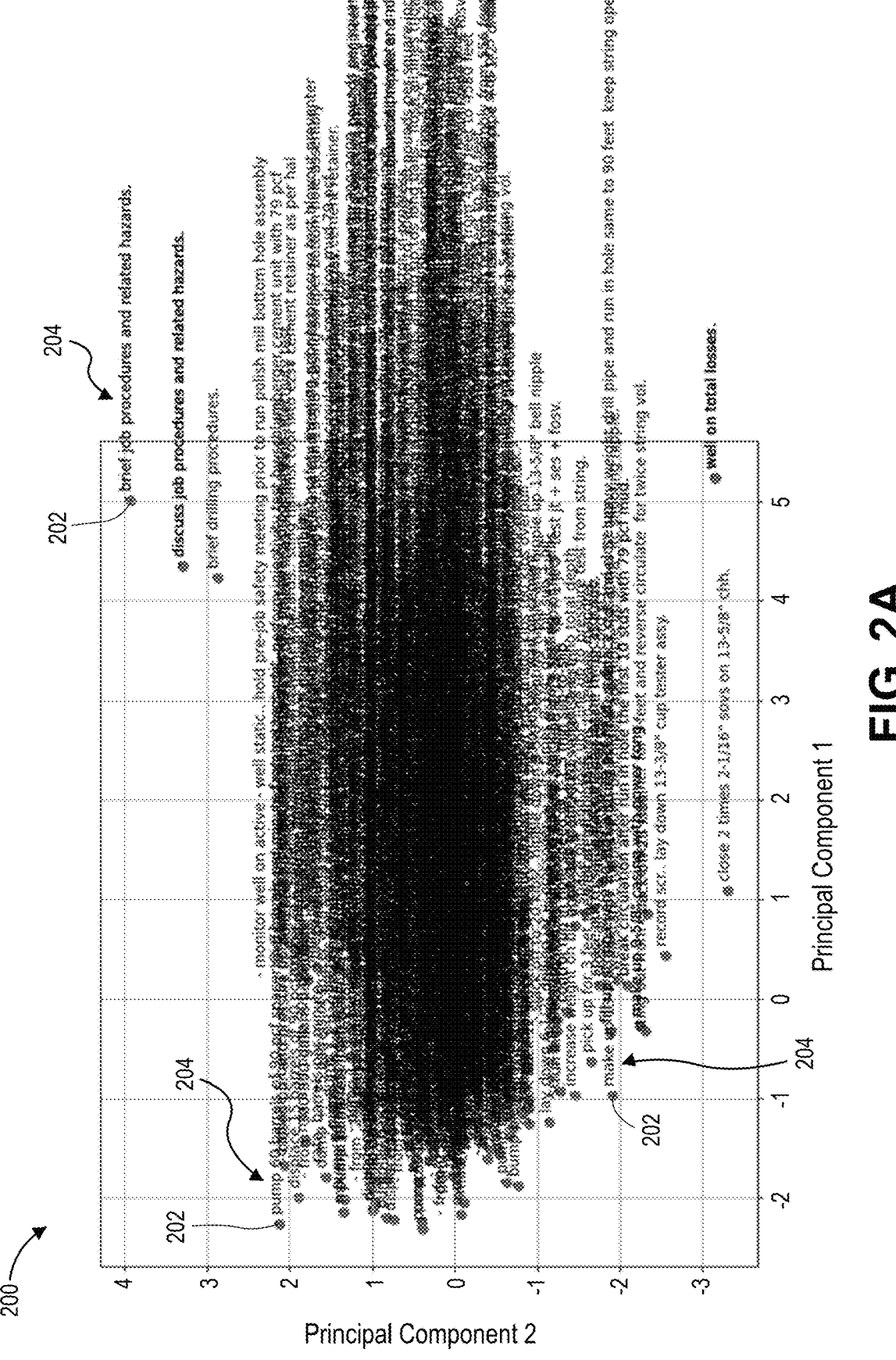
FIG. 2A illustrates an exemplary 2-dimensional (2D) graph including annotated vectors of a daily drilling report, according to an embodiment.

The method may include plotting each of the vectors having the embedded semantic meaning on a two-dimensional (2D) graph. FIG. 2A illustrates an exemplary 2D graph 200 including the vectors 202 of a respective DDR, according to one or more embodiments. As illustrated in FIG. 2A, each of the vectors 202 may be annotated with the respective sentence 204 of the DDR from which it was converted. Plotting each of the vectors 202 may include determining the respective axes of the 2D graph 200. The respective axes of the 2D graph 200 may be determined, at least in part, by the vectors 202 and/or the embedded semantic meanings thereof. For example, determining the x-axis and/or the y-axis of the 2D graph 200 may include extracting or determining eigenvectors from the vectors 202, where each of the eigenvectors may include a respective eigenvalue. Determining the x-axis and/or the y-axis of the 2D graph 200 may also include identifying the eigenvectors corresponding to or having the largest eigenvalues. For example, the x-axis and γ-axis may be represented by the eigenvectors having the two largest eigenvalues. It should be appreciated that the eigenvectors having the two largest eigenvalues may be or may represent the direction that captures the most semantic information. Accordingly, the x-axis and the y-axis may be determined by the respective eigenvectors of the embedded semantic space that may represent the direction that captures the most semantic information. Plotting each of the vectors 202 may include displaying each of the vectors 202 on the 2D graph 200, as illustrated in FIG. 2A. As further illustrated in FIG. 2A, each of the vectors 202 may be annotated with the respective sentence 204 related to the respective vector 202.

In one embodiment, the method may include determining or computing the similarities between each of the vectors 202 or the embedded semantic meaning thereof. For example, the method may include determining semantic similarities between the vectors 202, where the semantic similarities may be based on or determined with the embedded semantic meaning. For example, semantic similarities between the vectors 202 may be determined with the respective embedded semantic meaning thereof via a cosine similarity model or function. It should be appreciated that a respective distance between two or more vectors 202 may represent a degree of semantic similarities therebetween. For example, two vectors 202 having a relatively shorter distance therebetween may have a higher degree of semantic similarity than two vectors 202 having a relatively longer distance therebetween.

Figure 2B:
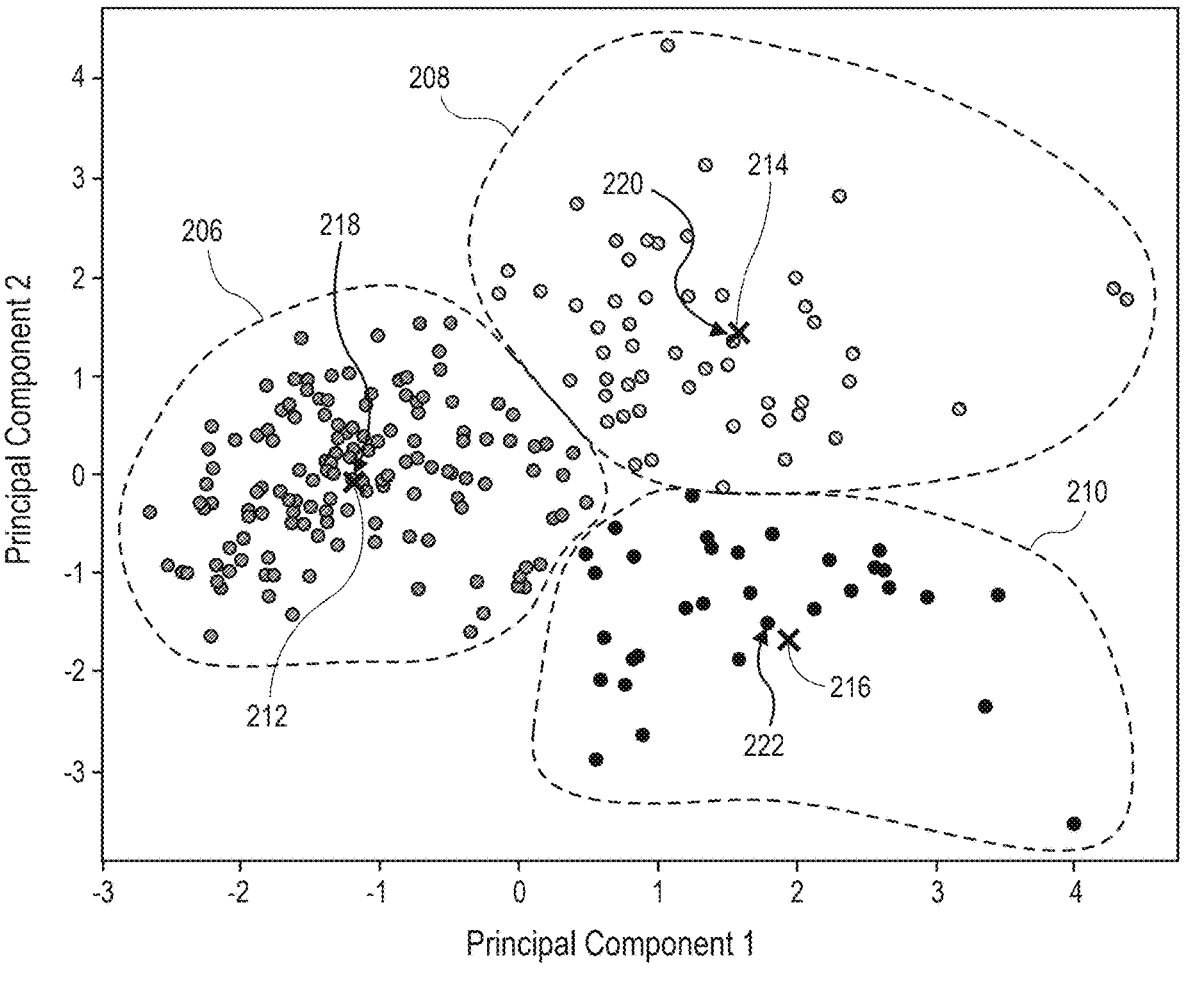
FIG. 2B illustrates the 2D graph of FIG. 2A including unannotated vectors of the daily drilling report and clusters of the unannotated vectors, according to an embodiment.

The method may also include generating and/or identifying clusters 206, 208, 210 of the vectors 202. FIG. 2B illustrates the 2D graph 200 of FIG. 2A including the vectors 202 of the respective DDR, according to one or more embodiments. For simplicity, FIG. 2B omits the annotation of the vectors 202 with the respective sentence 204. As illustrated in FIG. 2B, the vectors 202 may be grouped, identified, or associated with one or more clusters of sentences or clusters 206, 208, 210. The clusters 206, 208, 210 may be determined, at least in part, upon or by the respective semantic similarities between the vectors 202. For example, a first cluster 206 may represent, encompass, or include the vectors 202 that may have or exhibit relatively closer semantic similarities as compared to a second cluster 208. In another example, a second cluster 208 may represent, encompass, or include the vectors 202 that may have or exhibit relatively closer semantic similarities as compared to a third cluster 210. In yet another example, the third cluster 210 may represent, encompass, or include the vectors 202 that may have or exhibit relatively closer semantic similarities as compared to the first cluster 208. In at least one embodiment, each of the clusters 206, 208, 210 and/or the respective centroid 212, 214, 216 thereof may represent a category of the well or the drilling operation. For example, each of the clusters 206, 208, 210 and/or the respective centroid 212, 214, 216 thereof may represent an event of the well, a mitigation action taken with the well, a test or observation of the well, or the like, or any combination thereof. Illustrative categories of the clusters 206, 208, 210 and/or the respective centroid 212, 214, 216 thereof may be or include, but are not limited to, one or more of a loss circulation event, a mitigation action, a dynamic test, or the like. In an exemplary embodiment, the first cluster 206 may be related to loss circulation events of the well, the second cluster 208 may be related to mitigation actions conducted on the well, and the third cluster 210 may be related to dynamic tests conducted on the well.

In at least one embodiment, the method may include identifying a single vector 218, 220, 222 of each of the clusters 206, 208, 210 that represents a summary of the respective cluster 206, 208, 210. Identifying the single vector 218, 220, 222 of each of the clusters 206, 208, 210 that represents the summary of the respective cluster 206, 208, 210 may include identifying a centroid 212, 214, 216 of each of the clusters 206, 208, 210. For example, as illustrated in FIG. 2B, each of the clusters 206, 208, 210 may have a respective centroid 212, 214, 216. For example, the first cluster 206, the second cluster 208, and the third cluster 210 may have a first centroid 212, a second centroid 214, and a third centroid 216, respectively. Each of the centroids 212, 214, 216 may represent a mean or average position of the vectors 202 of the respective cluster 206, 208, 210. For example, the centroid 212, 214, 216 may be a barycenter of the respective cluster 205, 208, 210. In another example, the centroid 212, 214, 216 may also be a weighted average position of the vectors 202 of the respective cluster 206, 208, 210.

Identifying the single vector 218, 220, 222 of each of the clusters 206, 208, 210 that represents the summary of the respective cluster 206, 208, 210 may also include identifying the single vector 218, 220, 222 of each of the clusters 206, 208, 210 that may be the closest in distance to the respective centroid 212, 214, 216 thereof. For example, as illustrated in FIG. 2B, the method may include identifying a single vector 218 of the first cluster 206 of vectors 202 that may be the closest to the first centroid 212. In another example, the method may include identifying a single vector 220 of the second cluster 208 of vectors 202 that may be the closest to the second centroid 214. In yet another example, the method may include identifying a single vector 222 of the third cluster 210 of vectors 202 that may be the closest to the third centroid 216. As noted above, each of the vectors 202 may be related to a sentence of the DDRs via the embedded semantic meaning. Accordingly, the respective sentence associated with each of the single vectors 218, 220, 222 may be the most descriptive or representative of the respective cluster 206, 208, 210 or the category thereof. For example, the respective sentence associated with the single vector 218 may be the most descriptive or representative of the first cluster 206 or the loss circulation events of the well. In another example, the respective sentence associated with the single vector 220 may be the most descriptive or representative of the second cluster 208 or the mitigation actions conducted on the well. In yet another example, the respective sentence associated with the single vector 222 may be the most descriptive or representative of the third cluster 210 or the dynamic tests conducted on the well.

The method may also include displaying the clusters 206, 208, 210, the centroids 212, 214, 216, and the identified single vectors 218, 220, 222 on the 2D graph to provide a visual quality control, as illustrated in FIG. 2B.

The method may also include generating a summary of the undesired event. Generating the summary of the undesired event may include generating a summary with or including the sentences associated with the respective single vectors 218, 220, 222 identified. For example, the method may include generating a summary including the exact sentences associated with the single vectors 218, 220, 222. In another example, each of the sentences associated with the single vectors 218, 220, 222 may be condensed, briefed, or otherwise simplified, and the simplified sentences may be used to generate the summary. In yet another example, generating the summary may include concatenating the single vectors 218, 220, 222 to build the summary of the undesired events. The summary generated may be or form a portion of a Drilling Planning System of the well or the drilling operation. For example, the summary may be added to an event description for representation in the Drilling Planning System.

In at least one embodiment, the method may not include or utilize generative artificial intelligence (AI) during one or more steps or processes thereof. For example, the method may completely exclude the use of generative AI, thereby avoiding the introduction of hallucinations, such factual hallucinations, logical hallucinations, linguistic hallucinations, visual hallucinations, or the like. Accordingly, the methods disclosed herein may rely on extractive artificial (AI) models for reviewing and analyzing drilling events (e.g., undesired drilling events). Further, the summary may only include information present in the DDRs.

FIG. 3 illustrates a flowchart of a system 300 for analyzing drilling events of the well. The system 300 may include an information management system 302 operably coupled with a drilling planning system 304. The information management system 302 may include or store the DDRs. The information management system 302 may be capable of or configured to direct or provide the DDRs to the drilling planning system 304 operably coupled therewith. For example, as illustrated in FIG. 3, the information management system 304 may be capable of or configured to direct the DDRs to a daily drilling reporting summarization engine 306 of the drilling planning system 304. The daily drilling reporting summarization engine 306 may be capable of or configured to analyze drilling events (e.g., undesired drilling events) in the well as disclosed herein. For example, the daily drilling reporting summarization engine 306 may be capable of or configured to analyze drilling events in the well and generate the summary of the undesired drilling events. As illustrated in FIG. 3, the daily drilling reporting summarization engine 306 may be operably coupled with a performance computing system 308 and a risk planning system 310. Accordingly, the daily drilling reporting summarization engine 306 may be capable of or configured to direct or provide the summary of the undesired drilling events to the performance computation system 308 and/or the risk planning system 310. The risk planning system 310 may store or contain the summary of the undesired drilling events to be accessed by a user. For example, the drilling planning system 304 may include a user interface 312 capable of or configured to allow a user, such as a well engineer, to view the summary of the undesired drilling events. The user interface 312 may also be capable of or configured to allow the well engineer to view the DDRs of the well.

Exemplary Method

FIG. 4 illustrates a flowchart of a method 400 for analysing undesired drilling events in a well, according to an embodiment. An illustrative order of the method 400 is provided below; however, one or more portions of the method 400 may be performed in a different order, simultaneously, repeated, or omitted. At least a portion of the method 400 may be performed using a computing system.

The method 400 may include receiving input data, as at 402. The input data may be related to a drilling operation in the well. The input data may include daily drilling reports (DDRs) related to the well. The DDRs may include historical data related to the well. The DDRs may include sentences related to the historical data of the well. The sentences may be related to one or more undesired drilling events in the well, one or more actions applied to the well, day-to-day operational information of the well, or a combination thereof. The one or more undesired drilling events may include a stuck pipe event, a loss circulation event, or a combination thereof. Each of the undesired drilling events may include details about a failure mode, remedial attempts, or any combination thereof.

The method 400 may also include removing respective first portions of the DDRs that may be unrelated to the undesired drilling events, as at 404. The first portion of the DDRs may include day-to-day operational context of the well. The day-to-day operational context may include a rate of penetration (ROP) or a bottom hole assembly (BHA).

The method 400 may further include converting respective second portions of the DDRs into vectors, as at 406. Each of the vectors may include an embedded semantic meaning. The second portions may be converted with a model. The model may be a pre-trained embedding model. The pre-trained embedding model may be a Bidirectional Encoder Representation from Transformers (BERT) model. The BERT model may be a Sentence-BERT (sBERT) model.

The method 400 may also include plotting each of the vectors having the embedded semantic meaning on a two-dimensional (2D) graph, as at 408. Plotting each of the vectors may include displaying each of the vectors on the 2D graph, where each of the vectors may be annotated with the sentence related to the respective vector. Plotting each of the vectors may also include determining an x-axis and a y-axis of the 2D graph with the vectors. Determining the x-axis and the y-axis of the 2D graph may include extracting or determining eigenvectors from the vectors, where each of the eigenvectors may include a respective eigenvalue. Determining the x-axis and the y-axis of the 2D graph may also include identifying the eigenvectors having or including the two largest eigenvalues. The eigenvectors including the two largest eigenvalues may represent the x-axis and the y-axis.

The method 400 may also include determining semantic similarities between the vectors, as at 410. The semantic similarities may be based upon the embedded semantic meaning. The semantic similarities may be determined via a cosine similarity model. A respective distance between the vectors may represent a degree of semantic similarities therebetween.

The method 400 may also include generating clusters of the vectors based upon the semantic similarities, as at 412. Each of the clusters may be related to a category. For example, a first of the clusters may be related to loss circulation events, a second of the clusters may be related to mitigation actions, and a third of the clusters may be related to dynamic tests.

The method 400 may further include identifying a single vector of each of the clusters that represents a summary of the respective cluster, as at 414. Identifying the single vector of each of the clusters may include identifying a centroid of each of the clusters, and identifying the single vector of each of the clusters closest to the respective centroid thereof. The respective centroid of each of the clusters may be a weighted average position of the vectors of the respective cluster. The sentence associated with the single vector of each of the clusters may represent the summary of the respective cluster.

The method 400 may also include displaying clusters, the centroids, and the identified single vectors on the 2D graph to provide a visual quality control, as at 416.

The method 400 may further include generating and/or displaying a summary of the undesired drilling events, as at 418. Generating the summary may include concatenating the single vectors to build the summary of the undesired drilling events. The summary of the undesired drilling events may only include information present in the DDRs. The summary may not include information from a generative Artificial Intelligence (AI) model. The summary may not include hallucinations.

The method 400 may also include performing an offset well analysis based upon the summary of the undesired drilling event, as at 420.

The method 400 may also include performing an action in response to the summary of the undesired drilling events and/or a result of the offset well analysis, as at 422. The action may include one or more of a prevention action, a mitigation action, a contingency action, a remediation action, or a combination thereof. The action may also be or include generating and/or transmitting a signal that recommends, instructs, or causes a physical action to occur. The physical action may be or include varying the composition of the gas, varying the pressure of the gas, varying the temperature of the gas, varying a flow rate of the gas, actuating a valve in the pipeline, or a combination thereof.

Exemplary Computing System

Figure 5:
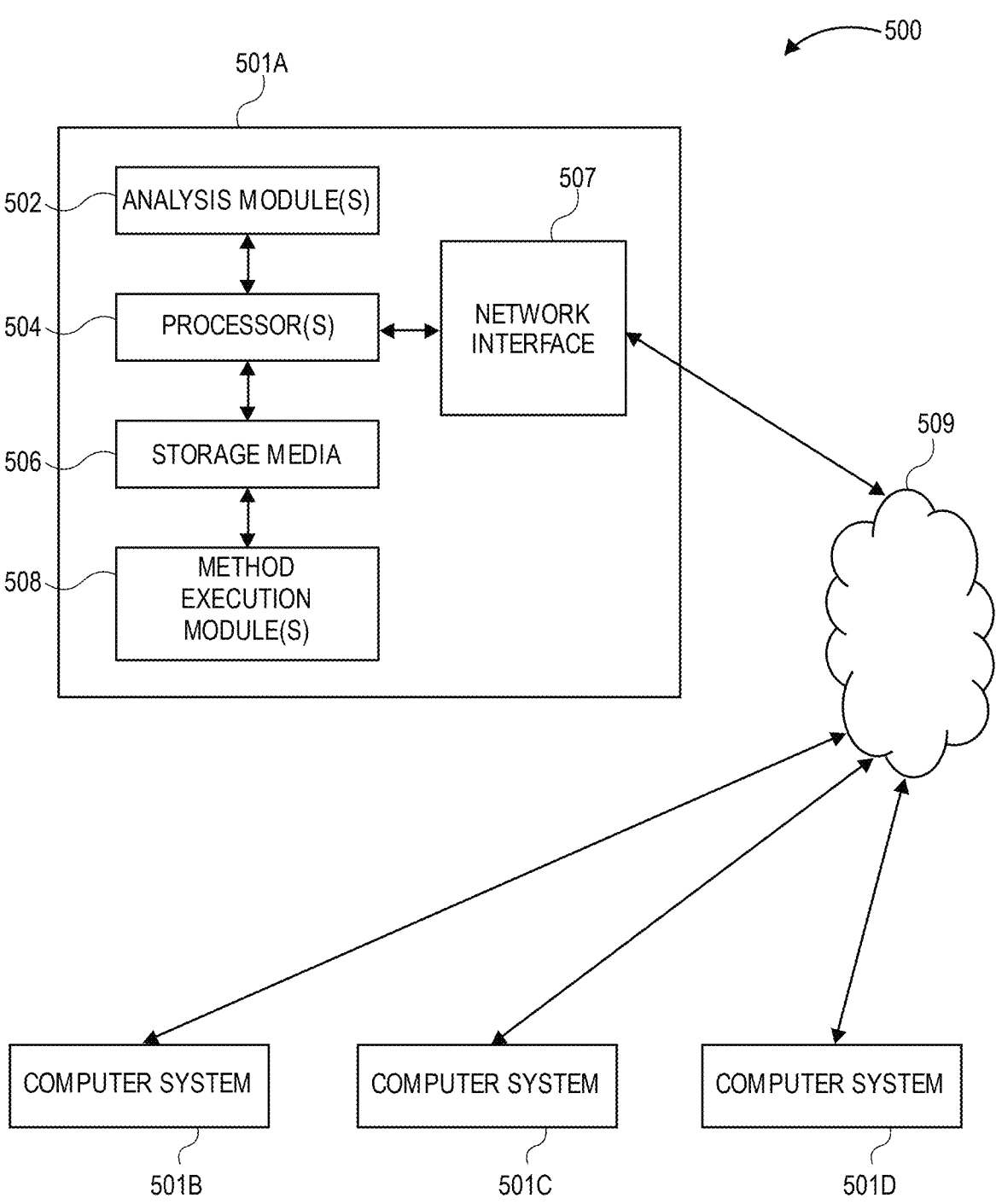
FIG. 5 illustrates a schematic view of a computing system for performing at least a portion of the method(s) described herein, according to an embodiment.

In some embodiments, the methods of the present disclosure may be executed by a computing system. FIG. 5 illustrates an example of such a computing system 500, in accordance with some embodiments. The computing system 500 may include a computer or computer system 501A, which may be an individual computer system 501A or an arrangement of distributed computer systems. The computer system 501A includes one or more analysis modules 502 that are configured to perform various tasks according to some embodiments, such as one or more methods disclosed herein. To perform these various tasks, the analysis module 502 executes independently, or in coordination with, one or more processors 504, which is (or are) connected to one or more storage media 506. The processor(s) 504 is (or are) also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor may include a microprocessor, microcontroller, processor module or subsystem, programmable integrated circuit, programmable gate array, or another control or computing device.

The storage media 506 may be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 500 contains one or more method execution module(s) 508. In the example of computing system 500, computer system 501A includes the method execution module 508. In some embodiments, a single method execution module may be used to perform some aspects of one or more embodiments of the methods disclosed herein. In other embodiments, a plurality of method execution modules may be used to perform some aspects of methods herein.

It should be appreciated that computing system 500 is merely one example of a computing system, and that computing system 500 may have more or fewer components than shown, may combine additional components not depicted in the example embodiment of FIG. 5, and/or computing system 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 500, FIG. 5), and/or through manual control by a user who may make determinations regarding whether a given step, action, template, model, or set of curves has become sufficiently accurate for the evaluation of the subsurface three-dimensional geologic formation under consideration.

The foregoing description, for purposes of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method for analysing undesired drilling events in a well, the method comprising:

receiving input data comprising daily drilling reports (DDRs) related to the well, wherein the DDRs comprise data related to one or more undesired drilling events in the well;

converting respective first portions of the DDRs related to the one or more undesired drilling events into vectors, wherein each vector comprises an embedded semantic meaning;

plotting each of the vectors on a two-dimensional (2D) graph, wherein plotting each of the vectors comprises determining an x-axis and a y-axis of the 2D graph with the vectors, wherein determining the x-axis and the y-axis of the 2D graph comprises:

extracting eigenvectors from the vectors, wherein each of the eigenvectors comprises an eigenvalue; and identifying the eigenvectors comprising two largest eigenvalues, wherein the eigenvectors comprising the two largest eigenvalues represent the x-axis and the y-axis;

determining semantic similarities between the vectors with the 2D graph, wherein a respective distance between the vectors represents a degree of semantic similarities therebetween;

generating clusters of the vectors plotted on the 2D graph based upon the semantic similarities, wherein a first cluster of the clusters is related to loss circulation events, wherein a second cluster of the clusters is related to mitigation actions, and wherein a third cluster of the clusters is related to dynamic tests;

identifying a single vector of each of the clusters that represents a summary of the respective cluster, wherein identifying the single vector comprises:

identifying a centroid of each of the clusters, wherein the respective centroid of each of the clusters is a weighted average position of the vectors of the respective cluster; and identifying the single vector of each of the clusters closest to the respective centroid thereof, wherein the single vector of each of the clusters represents the summary of the respective cluster;

displaying the clusters, the centroids, and the identified single vectors on the 2D graph to provide a visual quality control;

generating a summary of the one or more undesired drilling events with the identified single vectors; and generating and transmitting a signal to perform a physical action in response to the summary of the one or more undesired drilling events, wherein the physical action comprises at least actuating a valve to vary at least a flow rate, a pressure, or a temperature of the well associated with the one or more undesired drilling events.

2. The method of claim 1, further comprising removing respective second portions of the DDRs that are unrelated to the one or more undesired drilling events, wherein the respective first portions of the DDRs are converted into vectors with a model, and wherein the model is a pre-trained embedding model.

3. The method of claim 1, wherein a sentence associated with the single vector of each of the clusters represents the summary of the respective cluster.

4. The method of claim 1, wherein generating the summary of the one or more undesired drilling events with the identified single vector of each of the clusters comprises concatenating the single vectors to build the summary.

5. The method of claim 1, wherein the action in response to the summary of the one or more undesired drilling events comprises one or more of a prevention action, a mitigation action, a contingency action, a remediation action, or a combination thereof.

6. The method of claim 1, wherein the summary of the one or more undesired drilling event only comprises information present in the DDRs, wherein the summary does not comprise information from a generative Artificial Intelligence (AI) model, and wherein the summary does not comprise hallucinations.

7. A computing system, comprising:

one or more processors; and a memory system comprising one or more non-transitory computer-readable media storing instructions that, when executed by at least one of the one or more processors, cause the computing system to perform operations, the operations comprising:

receiving input data, wherein the input data is related to a drilling operation in a well and comprises daily drilling reports (DDRs) related to the well, wherein the DDRs comprise historical data related to the well, wherein the historical data comprises one or more undesired drilling events in the well;

removing respective first portions of the DDRs that are unrelated to the one or more undesired drilling events;

converting respective second portions of the DDRs that are related to the one or more undesired drilling events into vectors with a pre-trained embedding model, wherein each vector comprises an embedded semantic meaning;

plotting each of the vectors having the embedded semantic meaning on a two-dimensional (2D) graph, wherein plotting each of the vectors comprises determining an x-axis and a y-axis of the 2D graph with the vectors;

determining semantic similarities between the vectors with the 2D graph, wherein the semantic similarities are based upon the embedded semantic meaning, and wherein a respective distance between the vectors on the 2D graph represents a degree of semantic similarities therebetween;

generating clusters of the vectors plotted on the 2D graph based upon the semantic similarities, wherein a first cluster of the clusters is related to loss circulation events, wherein a second cluster of the clusters is related to mitigation actions, and wherein a third cluster of the clusters is related to dynamic tests;

identifying a single vector of each of the clusters that represents a summary of the respective cluster;

generating a summary of the one or more undesired drilling events with the identified single vectors of each of the clusters by concatenating the single vectors to build the summary of the one or more undesired drilling events;

performing an offset well analysis based upon the summary of the one or more undesired drilling events; and generating and transmitting a signal to perform a physical action in response to the summary of the one or more undesired drilling events or a result of the offset well analysis, wherein the physical action comprises at least actuating a valve to vary at least a flow rate, a pressure, or a temperature of the well associated with the one or more undesired drilling events.

8. The computing system of claim 7, wherein determining the x-axis and the y-axis of the 2D graph comprises:

extracting eigenvectors from the vectors, wherein each of the eigenvectors comprises an eigenvalue; and identifying the eigenvectors comprising two largest eigenvalues, wherein the eigenvectors comprising the two largest eigenvalues represent the x-axis and the y-axis.

9. The computing system of claim 7, wherein identifying the single vector comprises:

identifying a centroid of each of the clusters, wherein the respective centroid of each of the clusters is a weighted average position of the vectors of the respective cluster; and identifying the single vector of each of the clusters closest to the respective centroid thereof, wherein the single vector of each of the clusters represents the summary of the respective cluster.

10. A non-transitory computer-readable medium storing instructions that, when executed by one or more processors of a computing system, cause the computing system to perform operations, the operations comprising:

receiving input data, wherein the input data is related to a drilling operation in a well, wherein the input data comprises daily drilling reports (DDRs) related to the well, wherein the DDRs comprise historical data related to the well, wherein the DDRs comprise sentences related to the historical data, and wherein the historical data comprises one or more undesired drilling events in the well;

removing respective first portions of the DDRs comprising sentences that are unrelated to the one or more undesired drilling events, wherein the first portions of the DDRs comprise day-to-day operational context of the well;

converting respective second portions of the DDRs comprising sentences that are related to the one or more undesired drilling events into vectors with a pre-trained embedding model, wherein each of the sentences that are related to the one or more undesired drilling is converted to a respective vector, and wherein each of the vectors comprises an embedded semantic meaning;

plotting each of the vectors having the embedded semantic meaning on a two-dimensional (2D) graph, wherein plotting each of the vectors comprises:

displaying each of the vectors on the 2D graph, wherein each of the vectors is annotated with the sentence related to the respective vector; and determining an x-axis and a y-axis of the 2D graph with the vectors, wherein determining the x-axis and the y-axis of the 2D graph comprises:

extracting eigenvectors from the vectors, wherein each of the eigenvectors comprises an eigenvalue; and identifying the eigenvectors comprising two largest eigenvalues, wherein the eigenvectors comprising the two largest eigenvalues represent the x-axis and the y-axis;

determining semantic similarities between the vectors with the 2D graph, wherein the semantic similarities are based upon the embedded semantic meaning, wherein the semantic similarities are determined via a cosine similarity model, and wherein a respective distance between the vectors on the 2D graph represents a degree of semantic similarities therebetween;

generating clusters of the vectors on the 2D graph based upon the semantic similarities, wherein a first cluster of the clusters is related to loss circulation events, wherein a second cluster of the clusters is related to mitigation actions, and wherein a third cluster of the clusters is related to dynamic tests;

identifying a single vector of each of the clusters that represents a summary of the respective cluster, wherein identifying the single vector comprises:

identifying a centroid of each of the clusters, wherein the respective centroid of each of the clusters is a weighted average position of the vectors of the respective cluster; and identifying the single vector of each of the clusters closest to the respective centroid thereof, wherein the sentence associated with the single vector of each of the clusters represents the summary of the respective cluster;

displaying the clusters, the centroids, and the identified single vectors on the 2D graph to provide a visual quality control;

generating a summary of the one or more undesired drilling events with the identified single vectors of each of the clusters by concatenating the single vectors to build the summary of the one or more undesired drilling events, performing an offset well analysis based upon the summary of the one or more undesired drilling event; and generating and transmitting a signal to perform a physical action in response to the summary of the one or more undesired drilling events or a result of the offset well analysis, wherein the physical action comprises at least actuating a valve to vary at least a flow rate, a pressure, or a temperature of the well associated with the one or more undesired drilling events.

11. The non-transitory computer-readable medium of claim 10, wherein the sentences of the DDRs relate to the one or more undesired drilling events in the well, one or more actions applied to the well, day-to-day operational information of the well, or a combination thereof, wherein the one or more undesired drilling events comprise a stuck pipe event, a loss circulation event, or a combination thereof, and wherein each of the one or more undesired drilling events comprises details about a failure mode, remedial attempts, or any combination thereof.

12. The non-transitory computer-readable medium of claim 10, wherein the day-to-day operational context of the well comprises a rate of penetration (ROP) or a bottom hole assembly (BHA).

13. The non-transitory computer-readable medium of claim 10, wherein the pre-trained embedding model is a Bidirectional Encoder Representation from Transformers (BERT) model, and wherein the BERT model is a Sentence-BERT (sBERT) model.

14. The non-transitory computer-readable medium of claim 10, wherein the summary of the one or more undesired drilling event only comprises information present in the DDRs, wherein the summary does not comprise information from a generative Artificial Intelligence (AI) model, and wherein the summary does not comprise hallucinations.

* * * * *